United States Patent
Marelius

(10) Patent No.: US 8,390,141 B2
(45) Date of Patent: Mar. 5, 2013

(54) HYDROPOWER DEVICE

(75) Inventor: Fredrick Marelius, Stockholm (SE)

(73) Assignee: Proclino AB, Tyreso (SE)

(*) Notice: Subject to any disclaimer, the term of this patent is extended or adjusted under 35 U.S.C. 154(b) by 336 days.

(21) Appl. No.: 12/918,379

(22) PCT Filed: Feb. 19, 2008

(86) PCT No.: PCT/EP2008/051975
§ 371 (c)(1),
(2), (4) Date: Oct. 5, 2010

(87) PCT Pub. No.: WO2009/103332
PCT Pub. Date: Aug. 27, 2009

(65) Prior Publication Data
US 2011/0012351 A1    Jan. 20, 2011

(51) Int. Cl.
*F03B 13/00* (2006.01)
(52) U.S. Cl. .......................................... 290/54
(58) Field of Classification Search ............ 290/54
See application file for complete search history.

(56) References Cited

U.S. PATENT DOCUMENTS

| | | | |
|---|---|---|---|
| 6,546,723 | B1 | 4/2003 | Watten et al. |
| 2009/0066087 | A1* | 3/2009 | Van Huffel ................... 290/54 |
| 2010/0083653 | A1* | 4/2010 | Hawkins ..................... 60/517 |
| 2010/0117482 | A1* | 5/2010 | Russberg et al. .......... 310/306 |

FOREIGN PATENT DOCUMENTS

| | | |
|---|---|---|
| EP | 2302203 A1 * | 3/2011 |
| FR | 381962 | 1/1908 |
| GB | 2034413 | 6/1980 |
| GB | 2097062 | 10/1982 |
| GB | 2233045 | 1/1991 |
| JP | 2008133632 A * | 6/2008 |
| WO | WO 9621106 A1 * | 7/1996 |
| WO | 2007076866 | 7/2007 |
| WO | WO 2008116792 A1 * | 10/2008 |

* cited by examiner

*Primary Examiner* — Joseph Waks
(74) *Attorney, Agent, or Firm* — Michaud-Kinney Group LLP

(57) ABSTRACT

A hydropower device for generating electric power comprises a pipe having an upstream portion and a downstream portion and being arranged to convey water. A valve is provided at the downstream portion and adjustable between a closed position hindering the water and an open position permitting the water to flow. A cylinder member defines an inner space and having a first end and a second end. The inner space extends away from the pipe along a centre axis (x) and receives water from the pipe via the first end when the valve is in the closed position. A piston is disposed in the inner space and movable back and forth along the centre axis. The piston moves away from the pipe by means of an overpressure arising when the valve is in the closed position.

22 Claims, 5 Drawing Sheets

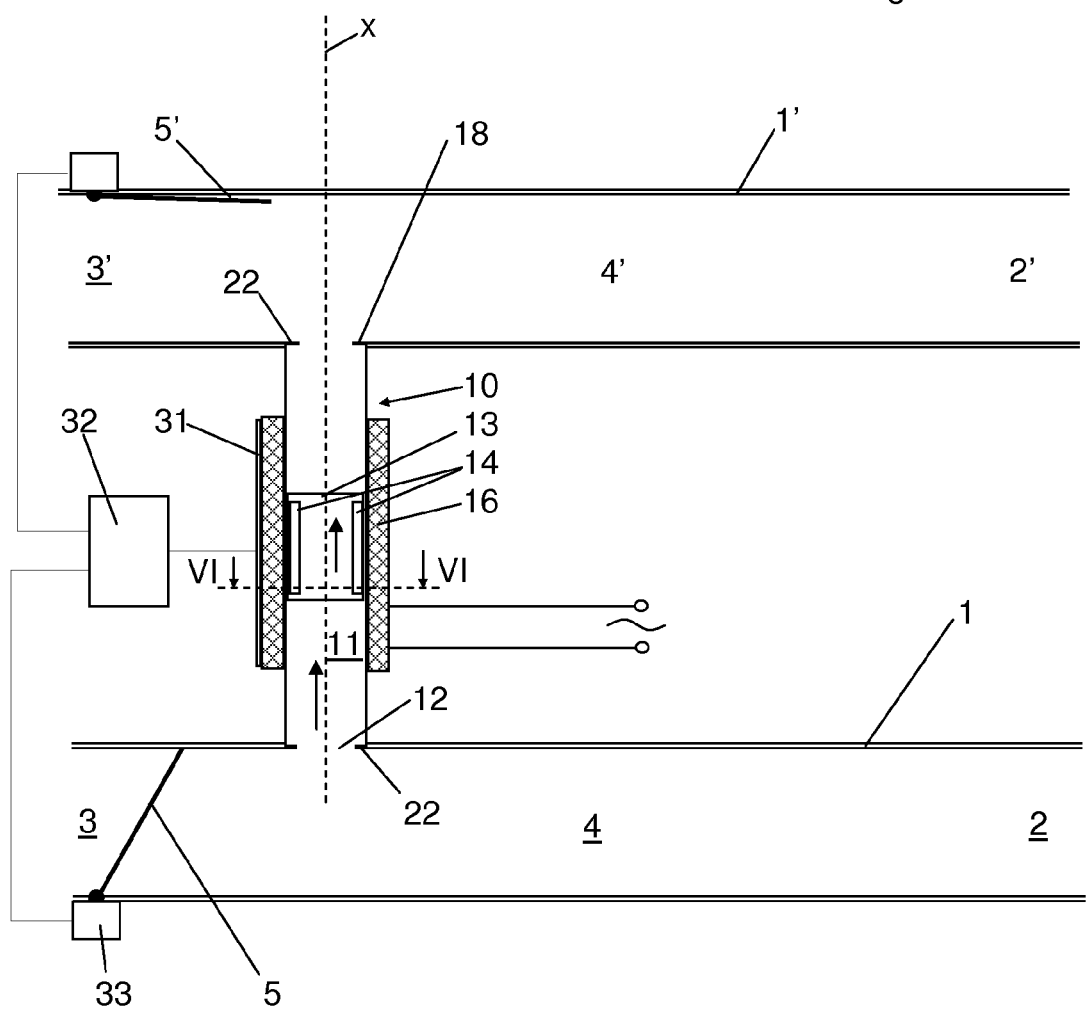

HYDROPOWER DEVICE

CROSS-REFERENCE TO RELATED APPLICATION

This application is a U.S. National Stage application of International Application No. PCT/EP2008/051975 filed Feb. 19, 2008.

BACKGROUND

Conventional hydropower typically incorporates a dam and a turbine driven by the hydraulic head. This type of dam based hydropower is efficient but may in many places be less suitable due to for example environmental concerns or that the terrain is inappropriate. Furthermore, this type of hydropower demands a fairly substantial initial investment and is consequently less profitable in places where the energy density of the river is low. Other hydropower solutions may consist of free turbines or turbines enclosed in pipes that utilises the water velocity in a manner similar to for example a wind mill. These types of low energy devices need to be fairly inexpensive in order to achieve an acceptable economic efficiency.

WO-2007/076866 discloses a hydropower device for generating electric power. The device comprises a pipe having an upstream portion and a downstream portion and being arranged to convey a flow of water. A valve member is provided on the pipe and adjustable between a closed position hindering the flow of water from exiting the pipe via the downstream portion or an open position permitting the flow of water to exit the pipe via the downstream portion. A cylinder member defines an inner space and has a passage between the inner space and the pipe upstream the downstream portion. The cylinder member extends away from the pipe along a centre axis and is configured to receive water from the flow of water at least when the first valve member is in the closed position. From the inner space water is conveyed to a turbine via a riser line.

U.S. Pat. No. 6,546,723 discloses another hydropower device for generating electric power. The device comprises a pipe having an upstream portion and a downstream portion and being arranged to convey a flow of water. A valve member provided at the upstream portion and adjustable between a closed position and an open position. A cylinder member defines an inner space and has a passage between the inner space and the pipe upstream the downstream portion. The cylinder extends away from the pipe and is configured to receive water from the flow of water at least when the first valve member is in the closed position.

SUMMARY

Some embodiments as described within provide an improved hydropower device adapted for generating electric power. The embodiments are related to a hydropower device which can be used for generating electric power from a flowing water having a relatively low velocity.

The hydropower device initially defined is characterised in that the device comprises a piston disposed in the cylindrical inner space to be movable back and forth along the centre axis and to be moved towards the second end by means of an overpressure arising at least when the first valve member is in the closed position, and that the piston forms a first part of an electrical linear generator outputting electric power in response to the movement of the piston.

By means of such a hydropower device, electric power may be gained from a flow of water in an efficient manner. The hydropower device is suitable for gaining electric power also when the flow velocity of the water is low. The hydropower device has an uncomplicated structure and can thus be manufactured and installed at a relatively low cost.

According to an embodiment, the electrical linear generator has a second part disposed outside the cylindrical inner space and surrounding the piston. Advantageously, the first part may comprise a set of magnets, whereas the second part may comprise an electric winding.

According to a further embodiment, the second end of the cylinder member is open.

According to a further embodiment, the device comprises a control arrangement for controlling the position of the first valve member.

According to a further embodiment, the control arrangement is configured to control the position of the first valve member in response to the position of the piston. Advantageously, the control arrangement may then comprise a sensor sensing the position of the piston and a controller controlling the position of the first valve member in response to the position sensed by the sensor.

According to another embodiment, the control arrangement is configured to control the position of the first valve member in response to velocity of the flow of water in the pipe. The control arrangement may then comprise a wing-shaped element provided on the first valve member and configured to move the first valve member from the open position to the closed position when the velocity of the flow of water through the pipe exceeds a certain level.

According to a further embodiment, the device comprises a second pipe having an upstream portion and a downstream portion and being arranged to convey water, a second valve member provided at the downstream portion of the second pipe and being adjustable between a closed position hindering the water from exiting the second pipe via the downstream portion and an open position permitting the water to exit the second pipe via the downstream portion, wherein the cylindrical inner space communicates with the second pipe upstream the downstream portion, and wherein the cylindrical inner space is configured to receive water from the second pipe at least when the second valve member is in the closed position. Advantageously, the control arrangement may be configured to control also the position of the second valve member.

According to a further embodiment, the hydropower device is configured to provide a counter-force moving the piston in an opposite direction away from the outer end at least when the first valve member is in the open position. In such a way, electric power will be generated when the piston moves both away from the outer end and towards the outer end.

According to a further embodiment, the cylinder member and the piston are configured in such a manner that the counter-force is provided by the gravity force acting on the piston in the opposite direction. The counter-force may also in an alternative or supplementary manner be provided by a spring acting on the piston in the opposite direction.

According to a further embodiment, wherein the outer end of the cylindrical inner space is closed permitting the formation of a gas-filled space between the piston and the outer end and wherein the gas-filled space provides the counter-force acting on the piston in the opposite direction.

According to a further embodiment, wherein the piston will force water to flow from the cylindrical inner space to the pipe via the passage when the piston is moved in the opposite direction. Alternatively or supplementary, the piston will force water to flow from the cylindrical inner space via a discharge valve member provided on the cylinder member when the piston is moved in the opposite direction. Advantageously, the control arrangement may be configured to control also the position of the discharge valve member.

According to a further embodiment, the cylindrical inner space communicates with the second pipe via the first end and wherein the first valve member is in the closed position when the second valve member is in the open position and the first valve member is in the open position when the second valve member is in the closed position. The closed position of the first valve member may then permit water to flow into the cylindrical inner space from the first pipe, wherein the closed position of the second valve member may permit water to flow into the cylindrical inner space of the second pipe.

According to a further embodiment, the cylindrical inner space communicates with the second pipe via the second end.

BRIEF DESCRIPTION OF THE DRAWINGS

The present invention is now to be explained more closely by a description of various embodiments and with reference to the drawings attached hereto.

FIG. 9 discloses schematically a view from above of a hydropower device according to a seventh embodiment with two pipes.

DETAILED DESCRIPTION

Figure 1:
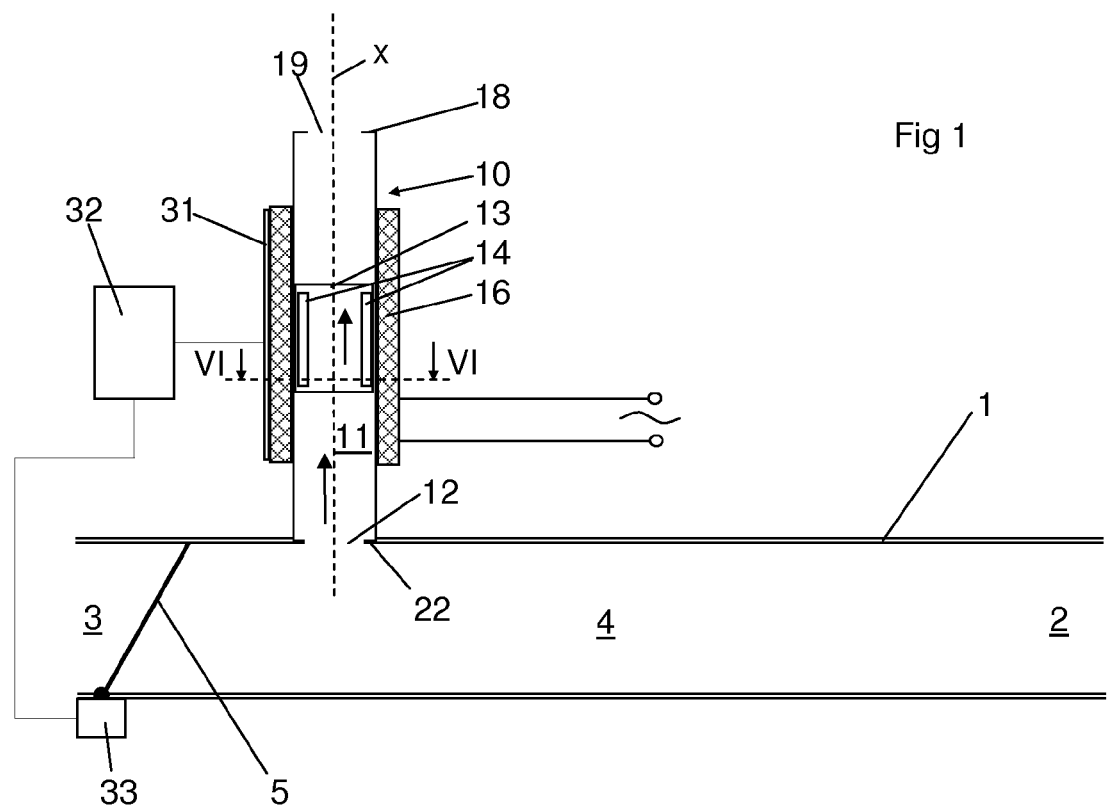
FIG. 1 discloses schematically a side view of a hydropower device according to a first embodiment with a valve member in a closed position.
Figure 2:
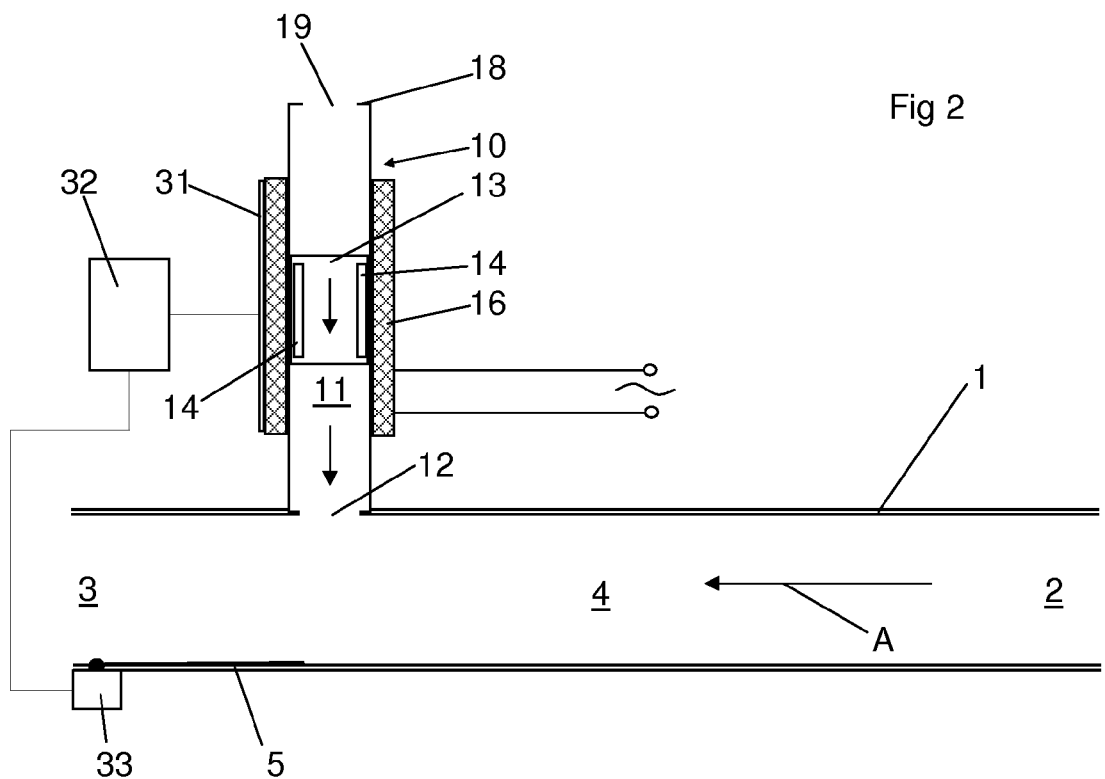
FIG. 2 discloses schematically a side view of the hydropower device in FIG. 1 with the valve member in an open position.

FIGS. 1 and 2 disclose schematically a first embodiment of a hydropower device. The hydropower device is arranged to be provided in a flowing water for generating electric power. The flowing water can be any kind of water stream, for instance a river, a water channel, a lake, a channel provided between to basins of water located a different heights etc. The hydropower device is adapted to convey a flow of water forming a part of or the flowing water and to absorb the energy of the flow of water.

The hydropower device comprises a first pipe 1 having an upstream portion 2, a downstream portion 3 and an intermediate portion 4 between the upstream portion 2 and the downstream portion 3. The first pipe 1 is arranged to convey water through the interior of pipe 1 in the direction of an arrow A at a flow velocity, see FIG. 2. A first valve member 5 provided at the downstream portion 3 and adjustable between a closed position, see FIG. 1, hindering the water from exiting the first pipe 1 via the downstream portion 3 and an open position permitting the water to exit the first pipe 1 via the downstream portion 3. When the first valve member 5 is in the closed position the flow velocity of the water in the interior of the first pipe 1 will thus be reduced and approach zero, see FIG. 1.

The hydropower device comprises a cylinder member 10 defining a cylindrical inner space 11. In the embodiments disclosed the cylinder member 10 is provided in the proximity of the pipe 1. The cylinder member 10 has a first end 12 and a second end 18. The cylindrical inner space 11 communicates with the interior of the first pipe 1 via the first end 12. The cylinder member 1 extends from a position upstream the downstream portion 3 away from the first pipe 1 along a centre axis x of the cylindrical inner space 11. The cylindrical inner space 11 is configured to receive water from the water in the pipe at least when the first valve member 5 is in the closed position, but possibly also when the first valve member 5 approaches the closed position. In the embodiments disclosed, the centre axis x extends in parallel, or substantially in parallel with a vertical direction. In addition, the centre axis x extends perpendicularly, or substantially perpendicularly, to a centre axis of the first pipe 1. It is to be noted that the centre axis x may extend in other directions with respect to the centre axis of the first pipe 1. Furthermore, the first pipe 1 does not necessarily have a straight extension as indicated in the embodiments disclosed.

The hydropower device also comprises a piston 13 disposed in the cylindrical inner space 11 to be movable therein back and forth along the centre axis x. The cylinder member 10 is configured to prevent the piston 13 from leaving the cylindrical inner space at the outer end 18 and at the inner end by means of stopping members 22. The stopping member 22, especially at the inner end, may be configured as one or several shoulders. It is also possible to provide a net or a filter-like member at the inner end functioning as a stopping member and separating debris and other particles from entering the inner cylindrical space 11.

The piston 13 forms a first part, or rotor, of an electrical linear generator outputting electric power in response to the movement of the piston 13. The electrical linear generator also has a second part, or stator, disposed outside the cylindrical inner space 11 and surrounding the piston 13. The first part comprises a set of magnets 14, which are distributed, e.g. uniformly distributed, around the periphery of the piston, whereas the second part comprises an electric winding 16. It is to be noted that it is possible to provide an electric winding in the piston 13 and a set of magnets outside the cylindrical inner space 11.

The outer end 18 of the cylinder member 10 and the cylindrical inner space 11 is turned away from the first pipe 1. In the first embodiment disclosed in FIGS. 1 and 2, the outer end 18 is open to the surroundings by means of an aperture 19. The piston 13 is configured to be moved towards the outer end 18 by means of a temporary overpressure created by the flow of water at least when the first valve member 5 is moved to the closed position. The overpressure will cause water to flow into the cylindrical inner space 11 from the interior of the first pipe 1, thus forcing the piston 13 towards the outer end 18.

The hydropower device is also configured to provide a counter-force moving the piston 13 in an opposite direction away from the outer end 18 at least when the first valve member 5 has been open and thus is in the open position, see FIG. 2. In the embodiment disclosed in FIGS. 1 and 2, the cylinder member 10 and the piston 13 are configured in such a manner that the counter-force is provided by the gravity force acting on the piston 13 in the opposite direction when the first valve member 5 is open. Thus, the weight of the piston will provide the counter-force required for moving the piston 13 in the opposite direction. The piston 13 may have the lower, the same or higher density than the water. Consequently, the piston 13 will force water to flow from the cylindrical inner space 11 to the first pipe 1 via the passage 12 when the piston 13 is moved in the opposite direction when the first valve member 5 is in the open position. It is to be noted that the electrical linear generator will generate electric power when the piston 13 is moved towards the outer end 18 and when the piston is moved in the opposite direction.

Figure 3:
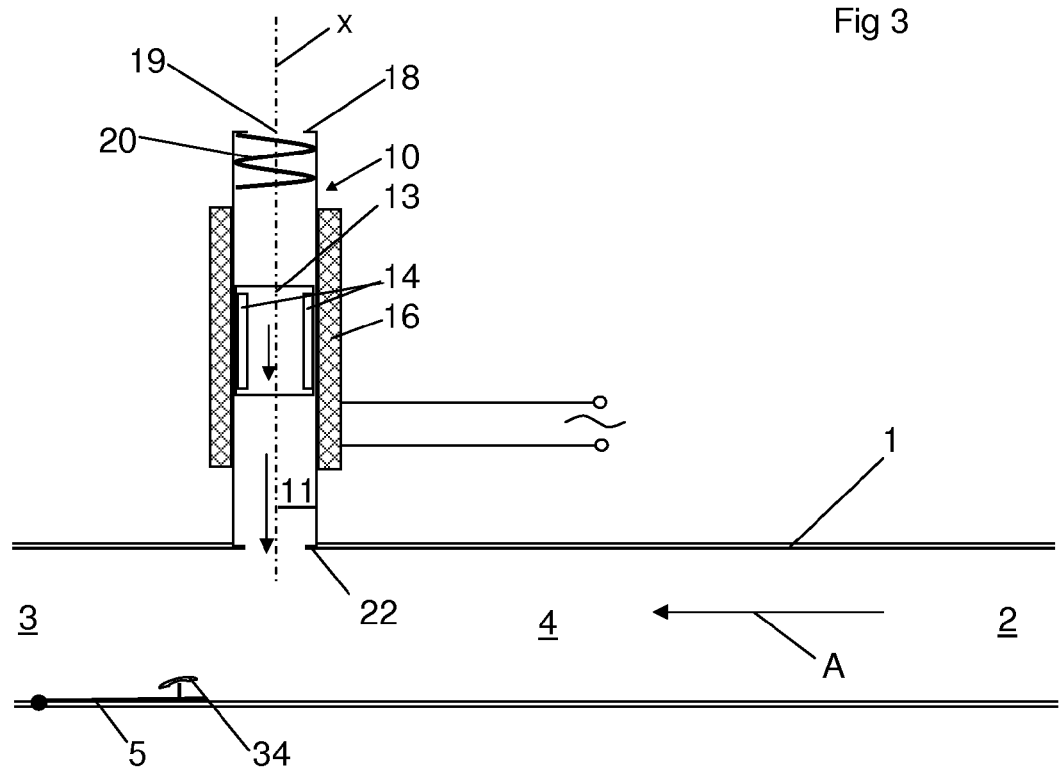
FIG. 3 discloses schematically a side view of a hydropower device according to a second embodiment.

In the second embodiment disclosed in FIG. 3, the counter-force is provided by a spring 20 acting on the piston in the opposite direction. The spring 20 is provided in the cylindrical inner space 11 at the outer end 18. The spring 20 is configured as a compression spring which will be compressed when the piston is moved towards the outer end by the flow of water when the first valve member 5 is closed or moved towards a closed position. When the first valve member 5 is open, the spring will contribute to forcing the piston 13 in the opposite direction. It is to be noted that components with the same function have been given the same reference signs in all embodiments.

In the first and second embodiments, the piston 13 is fitted in the cylindrical inner space 11 so that there may be a small gap between the outer surface of the piston 13 and the cylindrical inner surface defining the cylindrical inner space 11. In such way, a low friction for the movement of the piston 13 is ensured.

Figure 4:
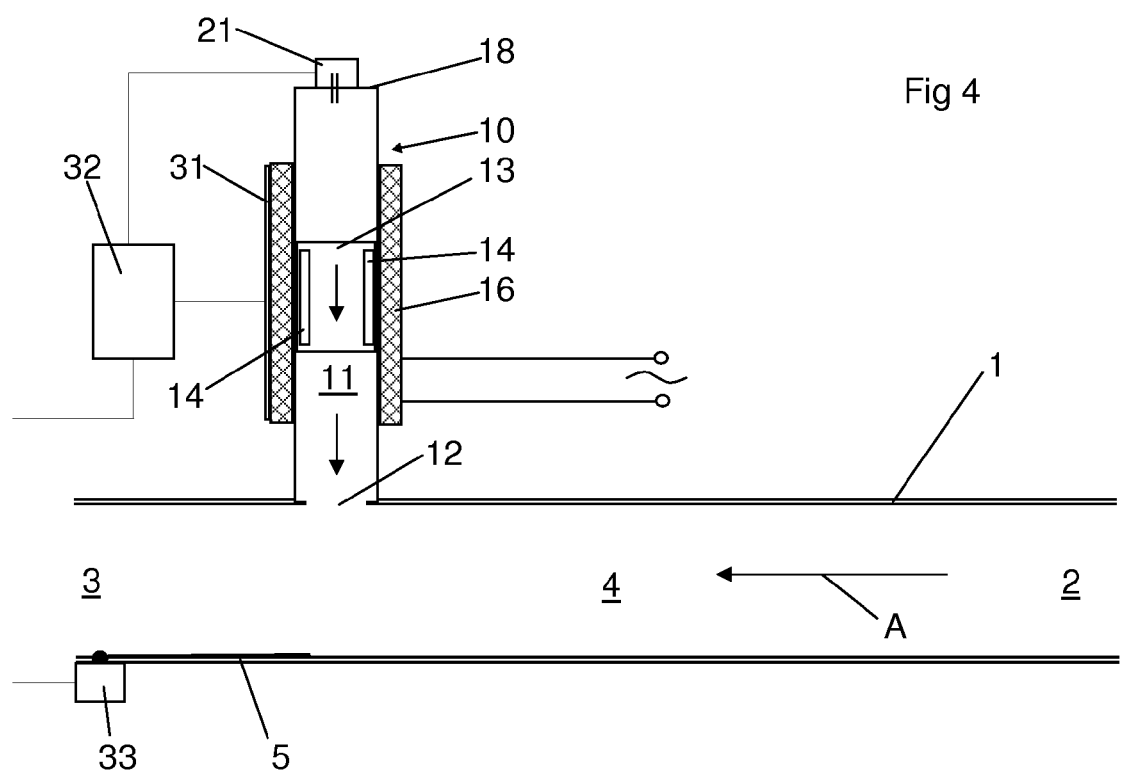
FIG. 4 discloses schematically a side view of a hydropower device according to a third embodiment.

In the third embodiment disclosed in FIG. 4, the outer end 18 of the cylindrical inner space 11 is closed permitting the formation of a gas-filled space between the piston 13 and the outer end 18. The gas-filled space will function as a spring and provide the counter-force acting on the piston 13 in the opposite direction in the same way as the spring in the second embodiment. A mechanism 21 may be provided for controlling and adjusting the pressure in the gas-filled space by introducing or discharging gas from the gas-filled space. In the third embodiment, the piston 13 is fitted in the cylindrical inner space 11 to seal against the cylindrical inner surface defining the cylindrical inner space 11 by means of suitable piston rings (not shown).

The hydropower device also comprises a control arrangement for controlling the position of the first valve member 5. In the first and third embodiments, the control arrangement is configured to control the position of the first valve member 5 in response to the position of the piston 13. For instance, the control arrangement may then comprise a sensor 31 sensing the position of the piston 13 and an controller 32 controlling the position of the first valve member 5 via an actuator 33 in response to the piston position sensed by the sensor 31. The controller 32 may be configured to initiate and performing opening of the first valve member 5 by means of the actuator 33 when the piston 13 has moved to an outer position in the proximity of the outer end 18. The piston 13 will then starts its movement in the opposite direction away from the outer end 18. The controller 32 is then configured to initiate and perform closing of the first valve member 5 when the piston has been moved to an inner position in the proximity of the passage 12.

As an alternative, the control arrangement may also be configured to control the position of the first valve member 5 in response to velocity of the flow of water in the first pipe 1. Such a controlling may be performed by means of a sensor sensing the flow velocity in the interior of the first pipe 1 upstream the first valve member 5. In the second embodiment, the control arrangement comprises a wing-shaped element 34 provided on the first valve member 5 and configured to move the first valve member 5 from the open position to the closed position when the velocity of the flow of water through the first pipe 1 exceeds a certain level. When the first valve member 5 has reached the closed position and the velocity of the flow of the water has decreased, the weight of the first valve member 5 will move the first valve member 5 towards the open position.

Figure 5:
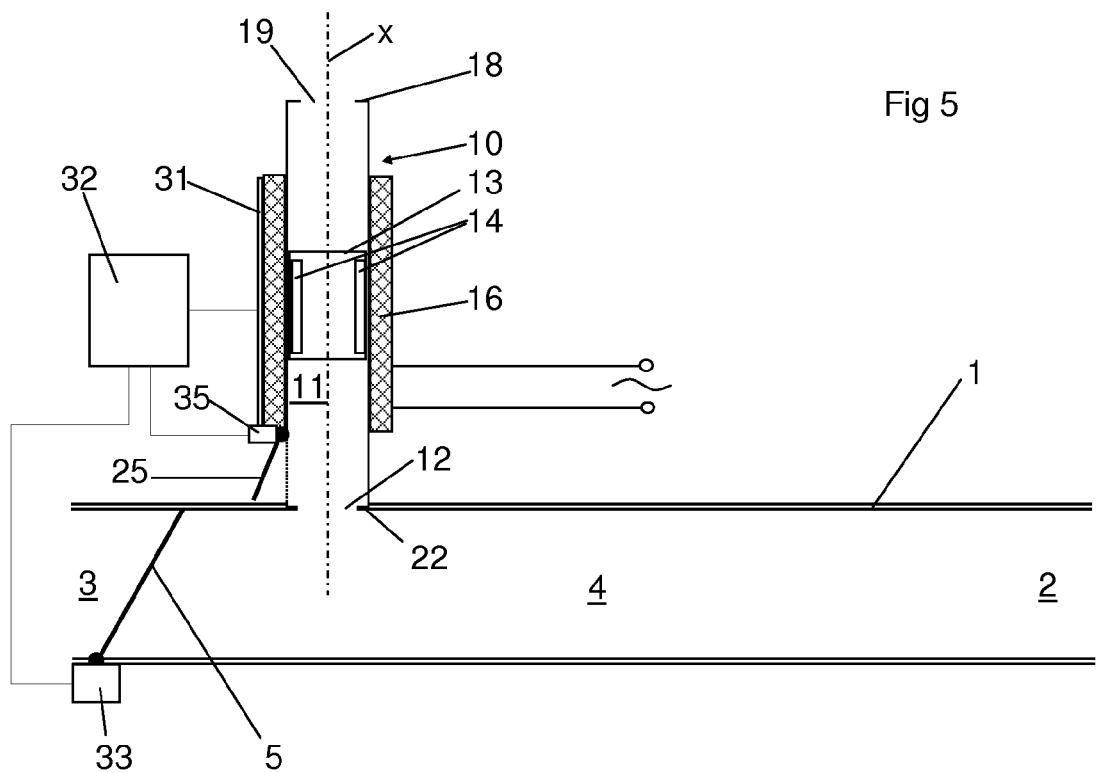
FIG. 5 discloses schematically a side view of a hydropower device according to a fourth embodiment.

In the fourth embodiment disclosed in FIG. 5, the hydropower device comprises a discharge valve member 25 provided on the cylinder member 10. The discharge valve member 25 is adjustable between a closed position when the piston 13 is moved towards the outer end 18 and an open position when the piston 13 is moved in the opposite direction. The piston 13 will thus force water to flow out from the cylindrical inner space 11 via the discharge valve member 25 is moved in the opposite direction. As illustrated in FIG. 5, the controller 32 of the control arrangement may be configured to control also the position of the discharge valve member 25 via a further actuator 35 in response to the position of the piston 13.

Figure 6:
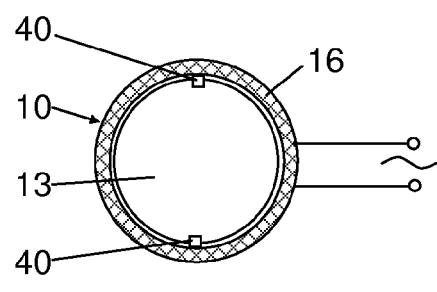
FIG. 6 discloses a sectional view along the line VI-VI in FIG. 1
Figure 7:
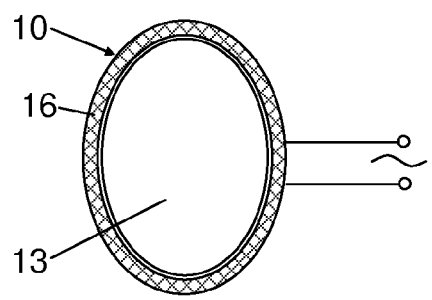
FIG. 7 discloses a sectional view similar to the one in FIG. 6 of a fifth embodiment.

The piston 13 and the cylindrical inner space 11 may have a circular cross-section as illustrated in FIG. 6. One or more guide elements 40 may be provided to guide the piston 13 and prevent the piston from rotating around the centre axis x. The piston 13 and the cylindrical inner space 11 may also have other cross-sectional shapes, for instance a oval cross-section as illustrated in FIG. 7.

It is to be noted that the discharge valve member 25 may be combined with the different counter-force generating solutions described above and not only with the embodiment where the counter-force acting on the piston 13 is provided by the gravity force as illustrated in FIG. 5. Also the self-controlled first valve member may be combined with the different counter-force generating solutions described above and not only with the embodiment where the counter-force acting on the piston 13 is provided by the spring 20 as illustrated in FIG. 3.

Figure 8:
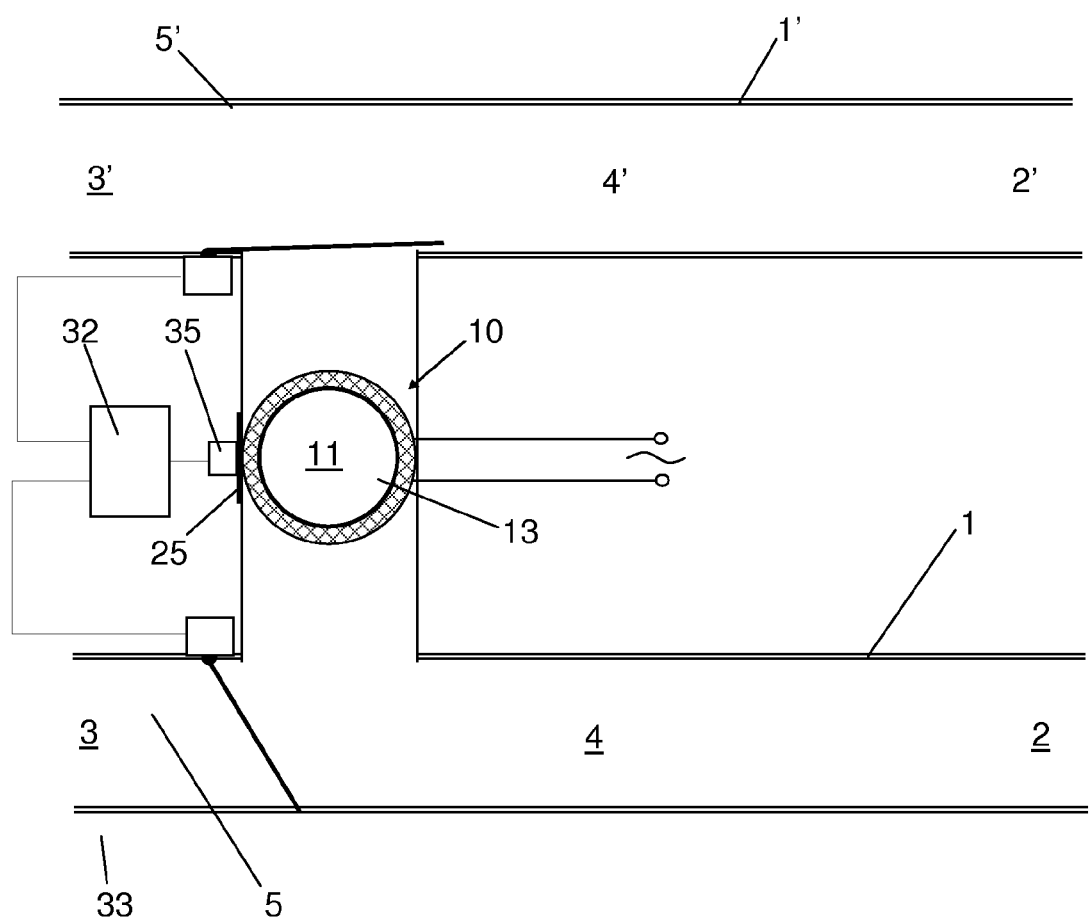
FIG. 8 discloses schematically a view from above of a hydropower device according to a sixth embodiment with two pipes.

FIG. 8 discloses a sixth embodiment which differs from the previous embodiments in that two pipes, a first pipe 1 and a second pipe 1' are provided. Also the second pipe 1' has an upstream portion 2', an intermediate portion 4' and a downstream portion 3' and is arranged to convey water. A second valve member 5' is provided at the downstream portion 3' of the second pipe 1' and adjustable between a closed position hindering the water from exiting the second pipe 1' via the downstream portion 3' and an open position permitting the water to exit the second pipe 1' via the downstream portion 3'. The cylindrical inner space 11 communicates with both the first pipe 1 and the second pipe 1' via the first end 12. The cylindrical inner space 11 is thus configured to receive water alternately from the first pipe 1 and from the second pipe 1'. The first valve member 5 then is in the closed position when the second valve member 5' is in the open position and the first valve member 5 is in the open position when the second valve member 5' is in the closed position. The closed position of the first valve member 5 thus permits water to flow into the cylindrical inner space 11 from the first pipe 1, and the closed position of the second valve member 5' permits water to flow into the cylindrical inner space 11 of the second pipe 1'. Both the first valve member 5 and the second valve member 5' are in the open position during a part of each cycle and then the discharge valve 25 is open to permit the piston 11 to move in the opposite direction from the second end 18 to the first end 12. The control arrangement is configured to control also the position of the second valve member 5' in the same manner as the first valve member 5, and to control the discharge valve 25.

FIG. 9 discloses a seventh embodiment of a hydropower device which also is provided with two pipes, a first pipe 1 and a second pipe 1'. In the seventh embodiment, the cylindrical inner space 11 communicates with the first pipe 1 via the first end 12 and with the second pipe 1' via the second end 18. Water is alternatively introduced into the cylindrical inner space 11 to push the piston in a back and forth movement. In this embodiment, there is thus no need for any specific means for providing a counter-force moving the piston 13 in an opposite direction away from the second end, but the counter-force will be provided by the flow of the second pipe 1'.

The present invention is not limited to the embodiments disclosed but may be varied and modified within the scope of the following claims.

It is to be noted that more than one cylinder member 10 each having a piston 13 and linear motor can be provided in each of the embodiments disclosed above. The cylinder members 10 may be arranged in parallel to each other.

The invention claimed is:

1. A hydropower device for generating electric power, comprising:
   at least a first pipe having an upstream portion and a downstream portion and being arranged to convey water;
   a first valve member provided at the downstream portion and being adjustable between a closed position hindering the water from exiting the first pipe via the downstream portion and an open position permitting the water to exit the first pipe via the downstream portion;
   a cylinder member defining a cylindrical inner space and having a first end and a second end, wherein the cylindrical inner space communicates with the first pipe upstream the downstream portion via the first end, and wherein the cylindrical inner space extends away from the first pipe towards the second end along a centre axis (x) and is configured to receive water from the first pipe at least when the first valve member is in the closed position, wherein the device comprises a piston disposed in the cylindrical inner space to be movable back and forth along the centre axis (x) and to be moved towards the second end by means of an overpressure arising at least when the first valve member is in the closed position, and wherein that the piston forms a first part of an electrical linear generator outputting electric power in response to the movement of the piston.

2. A hydropower device according to claim 1, wherein the electrical linear generator has a second part disposed outside the cylindrical inner space and surrounding the piston.

3. A hydropower device according to claim 2, wherein the first part comprises a set of magnets.

4. A hydropower device according to claim 2, wherein the second part comprises an electric winding.

5. A hydropower device according to claim 1, wherein the second end is open.

6. A hydropower device according to claim 1, wherein the device comprises a control arrangement for controlling the position of the first valve member.

7. A hydropower device according to claim 6, wherein the control arrangement is configured to control the position of the first valve member in response to the position of the piston.

8. A hydropower device according to claim 7, wherein the control arrangement comprises a sensor sensing the position of the piston and a controller controlling the position of the first valve member in response to the position sensed by the sensor.

9. A hydropower device according to claim 8, wherein the control arrangement is configured to control the position of the first valve member in response to velocity of the flow of water in the pipe.

10. A hydropower device according to claim 9, wherein the control arrangement comprises a wing-shaped element provided on the first valve member and configured to move the first valve member from the open position to the closed position when the velocity of the flow of water through the pipe exceeds a certain level.

11. A hydropower device according to claim 1, wherein the device comprises a second pipe having an upstream portion and a downstream portion and being arranged to convey water, a second valve member provided at the downstream portion of the second pipe and being adjustable between a closed position hindering the water from exiting the second pipe via the downstream portion and an open position permitting the water to exit the second pipe via the downstream portion, wherein the cylindrical inner space communicates with the second pipe upstream the downstream portion, and wherein the cylindrical inner space is configured to receive water from the second pipe at least when the second valve member is in the closed position.

12. A hydropower device according to claim 11, wherein the control arrangement is configured to control also the position of the second valve member.

13. A hydropower device according to claim 11, wherein the cylindrical inner space communicates with the second pipe via the second end.

14. A hydropower device according to claim 1, wherein the device is configured to provide a counter-force moving the piston in an opposite direction away from the second end at least when the first valve member is in the open position.

15. A hydropower device according to claim 14, wherein the cylinder member and the piston are configured in such a manner that the counter-force is provided by the gravity force acting on the piston in the opposite direction.

16. A hydropower device according to claim 14, wherein the counter-force is provided by a spring acting on the piston in the opposite direction.

17. A hydropower device according to claim 14, wherein the second end of the cylindrical inner space is closed permitting the formation of a gas-filled space between the piston and the second end and wherein the gas-filled space provides the counter-force acting on the piston in the opposite direction.

18. A hydropower device according to claim 17, wherein the piston will force water to flow from the cylindrical inner space to the pipe via the passage when the piston is moved in the opposite direction.

19. A hydropower device according to claim 17, wherein the piston will force water to flow from the cylindrical inner space via a discharge valve member associated with the cylinder member when the piston is moved in the opposite direction.

20. A hydropower device according to claim 19, wherein the control arrangement is configured to control also the position of the discharge valve member.

21. A hydropower device according to claim 20, wherein the cylindrical inner space communicates with the second pipe via the first end and wherein the first valve member is in the closed position when the second valve member is in the open position and the first valve member is in the open position when the second valve member is in the closed position.

22. A hydropower device according to claim 21, wherein the closed position of the first valve member permits water to flow into the cylindrical inner space from the first pipe, and wherein the closed position of the second valve member permits water to flow into the cylindrical inner space of the second pipe.

* * * * *